(12) United States Patent
McSpadden et al.

(10) Patent No.: US 8,444,014 B2
(45) Date of Patent: May 21, 2013

(54) SYSTEM AND METHOD FOR FRAUD DETECTION BY LOW FLOW RATE MONITORING AT A FUEL DISPENSER

(75) Inventors: John Steven McSpadden, Kernersville, NC (US); Benjamin T. Siler, Stokesdale, NC (US)

(73) Assignee: Gilbarco Inc., Greensboro, NC (US)

( * ) Notice: Subject to any disclaimer, the term of this patent is extended or adjusted under 35 U.S.C. 154(b) by 656 days.

(21) Appl. No.: 12/580,405

(22) Filed: Oct. 16, 2009

(65) Prior Publication Data

US 2011/0093118 A1    Apr. 21, 2011

(51) Int. Cl.
*B67D 1/00*  (2006.01)

(52) U.S. Cl.
USPC .................. 222/59; 222/14; 222/40; 222/63; 222/71; 141/192; 73/1.36; 702/46

(58) Field of Classification Search .................. 141/94, 141/192; 73/1.16, 1.36, 1.73–1.74; 702/45–46, 702/100; 222/14, 23, 40, 52, 56, 59, 63, 71; 700/108, 700/244

See application file for complete search history.

(56) References Cited

U.S. PATENT DOCUMENTS

| | | | |
|---|---|---|---|
| 4,831,866 A | 5/1989 | Forkert et al. | |
| 5,056,017 A | 10/1991 | McGarvey | |
| 5,325,706 A | 7/1994 | Grose | |
| 5,363,093 A | 11/1994 | Williams et al. | |
| 5,929,314 A * | 7/1999 | Bergkvist et al. | 73/1.36 |
| 6,109,477 A | 8/2000 | Myers et al. | |
| 6,119,110 A | 9/2000 | Carapelli | |
| 6,247,615 B1 * | 6/2001 | Taylor | 222/59 |
| 6,296,148 B1 | 10/2001 | Myers et al. | |
| 6,421,616 B1 | 7/2002 | Dickson | |
| 6,438,452 B1 | 8/2002 | Dickson | |
| 6,463,389 B1 | 10/2002 | Dickson | |
| 6,745,104 B1 | 6/2004 | Dickson | |
| 6,882,941 B2 | 4/2005 | Nanaji et al. | |
| 7,028,561 B2 * | 4/2006 | Robertson et al. | 73/861.79 |
| 7,076,330 B1 * | 7/2006 | Dickson | 700/244 |
| 7,837,063 B2 * | 11/2010 | Stoddard | 222/14 |
| 2007/0265733 A1 | 11/2007 | Harrell | |
| 2008/0120191 A1 | 5/2008 | Long | |
| 2011/0031267 A1 * | 2/2011 | Liebal et al. | 222/1 |

* cited by examiner

*Primary Examiner* — Kevin P Shaver
*Assistant Examiner* — Andrew P Bainbridge
(74) *Attorney, Agent, or Firm* — Nelson Mullins Riley & Scarborough LLP

(57) ABSTRACT

A system and method of detecting fuel theft at a fuel dispenser. The system has a fluid flow meter, a pulser operatively coupled to said fluid flow meter, and a control system in electrical communication with the pulser. The control system is configured to calculate a flow rate of fuel being dispensed from a gasoline dispenser during a single dispensing transaction. The flow rate is sampled at predetermined time intervals during the single dispensing transaction. The system then compares the sampled flow rates to a predetermined flow rate pattern indicative of potential fraud. A shutoff signal is then provided to the dispenser to stop fuel flow through the dispenser if the sampled flow rates are substantially similar to the predetermined pattern.

9 Claims, 3 Drawing Sheets

SYSTEM AND METHOD FOR FRAUD DETECTION BY LOW FLOW RATE MONITORING AT A FUEL DISPENSER

FIELD OF THE INVENTION

The present invention relates to the art of fuel dispensers. More particularly, the present invention relates to the detection of, and response to, fuel theft.

BACKGROUND OF THE INVENTION

As fuel prices continue to rise, small businesses and global enterprises find themselves paying more for nearly every input and service needed to bring their products and services to market. Consumers have had to adjust because they must pay more at the grocery store, shopping malls, and to fill up their tanks. Moreover, as fuel prices continue to rise, the incentive to steal fuel becomes greater. In regions of the United States, for example, fuel theft has become a significant cost to station owners.

With dispenser and site layouts today, an attendant may never know theft has begun or occurred. Even if the attendant is able to detect theft by observation, they may not know how long it has been since the theft took place or how many people got free fuel (and therefore, information about the theft may not be available). In some cases, surveillance video footage shows multiple people orchestrating fuel theft to fill multiple vehicles over an extended period of time. News media make the problem worse by increasing attention to the issue of fuel theft, and in some instances, clearly describing and illustrating what was done to steal fuel.

The present invention recognizes and addresses the foregoing considerations, and others, of prior art constructions and methods.

SUMMARY OF THE INVENTION

In accordance with one aspect, the present inventions provides a fuel dispenser comprising a fluid flow meter, a pulser operatively coupled to said fluid flow meter, and a control system in electrical communication with and said pulser. Said control system is configured to calculate a flow rate of fuel being dispensed via pulser signals produced by said pulser, periodically sample said flow rate to provide sampled flow rate readings, compare said sampled flow rate readings to a predetermined flow criterion, and shutoff flow of fuel if at least two of said sampled flow rate readings satisfy a predetermined pattern when compared with said predetermined flow criterion.

In some embodiments, said predetermined flow criterion is a predetermined flow range. In other embodiments, said predetermined flow rate range is between approximately 0.5 and 2 gallons per minute. In still other embodiments, said control system is configured to begin sampling said flow rate at a predetermined time after dispensing has begun. In some of these embodiments, said pattern occurs when said sampled flow rate readings fall within said predetermined flow rate range a preset number of times during a single dispensing transaction. In still other of these embodiments, said preset number is at least ten. In yet other of these embodiments, said control system is configured to shutoff flow if said sampled flow rate readings fall within said predetermined flow rate range at least ten consecutive times during a single dispensing transaction.

In other embodiments, said predetermined pattern includes the flow rate approximately equaling zero a preset number of times during a single dispensing transaction. In these embodiments, the pattern includes the flow rate approximately equaling zero a preset number of consecutive times during a single dispensing transaction.

In a preferred method of detecting fuel theft at a fuel dispenser, the dispenser has a flow meter, a pulser operatively coupled to said flow meter, and a control system operatively coupled to said pulser. The method comprises the steps of calculating a flow rate of fuel through said flow meter based on pulses generated from said pulser, sampling said flow rate at predetermined time intervals during a single dispensing transaction to provide sampled flow rate readings, comparing said sampled flow rates to a predetermined pattern, and providing a shutoff signal to said dispenser to stop fuel flow through said dispenser if said sampled flow rates satisfy said predetermined pattern.

In some of these embodiments, said predetermined pattern occurs when said sampled readings fall within a predetermined flow rate range a preset number of times during said single dispensing transaction. In some of these embodiments, said preset number of times is at least ten. In yet other of these embodiments, said control system is configured to stop fuel flow when said sampled flow rate readings fall within said predetermined flow rate range for at least ten consecutive times during said single dispensing transaction.

In still other embodiments, said predetermined flow rate range is between approximately 0.5 and 2.0 gallons per minute. In other embodiments, the method further comprises the step of providing an alarm indicator if said predetermined pattern is detected. In yet other embodiments, said predetermined pattern includes the sampled flow rate readings indicating flow of zero gallons per minute a preset number of times during said single dispensing transaction. In other embodiments, the method further comprises step of transmitting an alarm signal to a central station.

In another preferred method of detecting fuel theft at a fuel dispenser, the method comprises calculating a flow rate of fuel being dispensed from a gasoline dispenser over a single dispensing transaction, sampling said flow rate at predetermined time intervals during said single dispensing transaction to produce sampled flow rate readings, comparing said sampled flow rate readings to a predetermined criterion, and providing a shutoff signal to said dispenser to stop fuel flow through said dispenser if said comparison indicates low flow not expected during normal operation of said dispenser.

In some embodiments, said shutoff signal is provided when said sampled flow rate readings fall below a predetermined flow rate threshold a preset number of times during said single dispensing transaction. In some of these embodiments, said preset number of times is at least ten. In still others of these embodiments, fuel flow is shutoff if said preset number of times are consecutive. In other embodiments, the method further comprises the step of obtaining a photograph of the dispenser area if said shutoff signal is provided.

The accompanying drawings, which are incorporated in and constitute a part of this specification, illustrate one or more embodiments of a system in accordance with the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
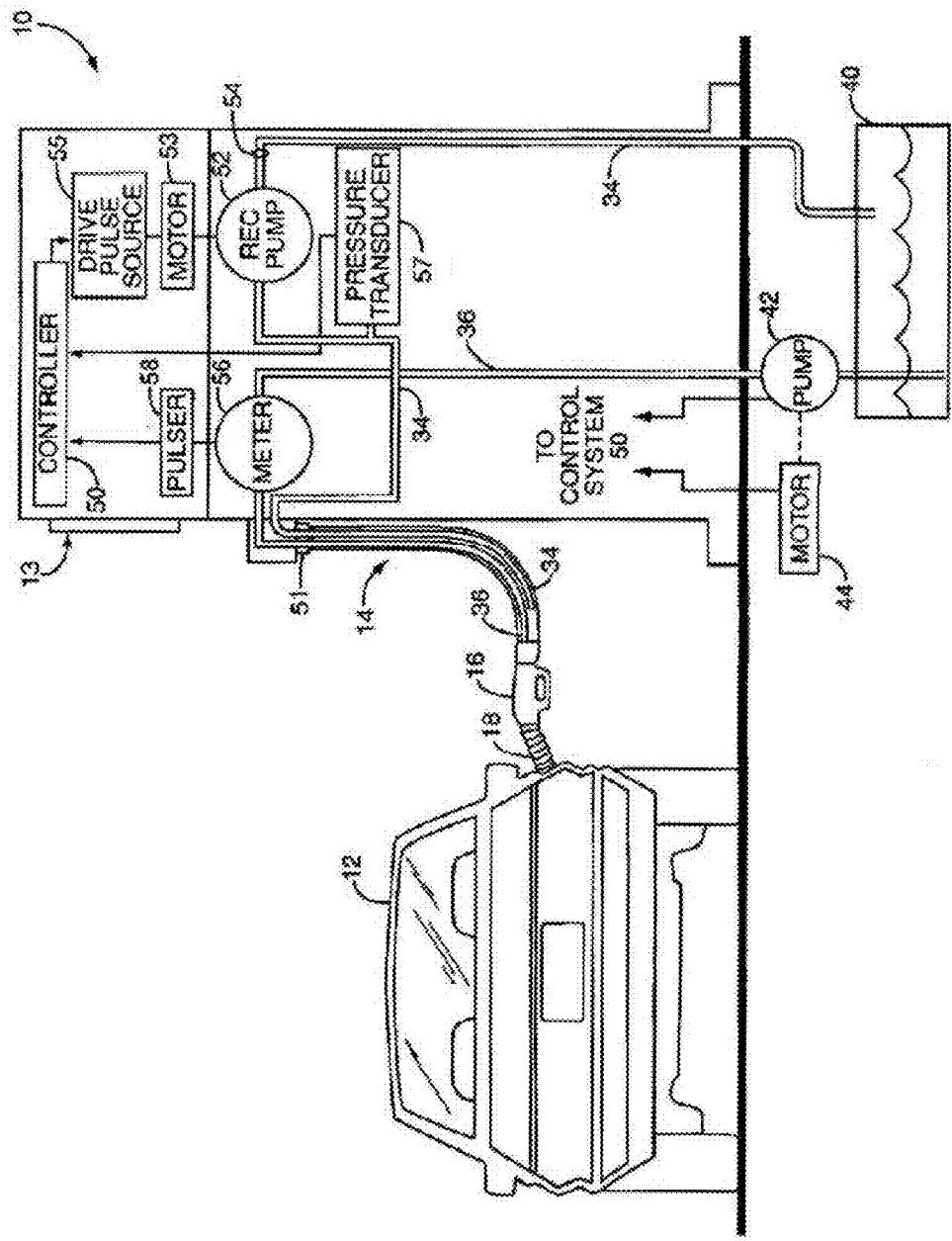
FIG. 1 is a schematic view of a fuel dispenser in accordance with one embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations. Additional aspects and advantages of the invention will be set forth in part in the description which follows and, in part, will be discerned from the description, or may be learned by practice of the invention.

Referring to FIG. 1, a fuel dispenser 10 delivers gasoline or other liquid fuel to a vehicle 12 through a delivery hose 14 coupled to a nozzle 16 having a spout 18. A display 13 provides a customer interface that displays price per unit, total cost, gallons (or liters) and other information associated with a fueling transaction. While display 13 may be a purely visual display, it may also be a touch display that allows the customer to make inputs at the dispenser. Alternatively, the inputs may be made by pressing mechanical buttons on the dispenser face. In this illustrative embodiment, delivery hose 14 includes a product delivery line 36 and a vapor return line 34 that are both in fluid communication with an underground storage tank (UST) 40. A pump 42, controlled by motor 44, extracts fuel from UST 40 and provides it to product delivery line 36. Typically, pump 42 will be a submersible turbine pump (STP) located at UST 40, although suction systems in which the pump is located within the dispenser housing are contemplated. A single pump 42 and motor 44 may serve a plurality of fuel dispensers 10, or a single fuel dispenser.

A vapor recovery system may be present in fuel dispenser 10, to recover vapors that the incoming fuel displaces during fueling. In this embodiment, for example, vapor is recovered from the gas tank of vehicle 12 through vapor return line 34 with the assistance of a vapor recovery pump 52 that is driven by a motor 53. Vapor recovery pump 52 may be a variable speed pump or a constant speed pump with or without a controlled valve (not shown) as is well known in the art.

A control system 50 receives information from a pulser 58 operatively coupled to a meter 56 in fuel delivery line 36. As the fuel passes through meter 56 there is mechanical movement that is detected by pulser 58. In particular, pulser 58 will generate a pulse train the frequency of which is related to flow though meter 56. In one preferred embodiment, for example, pulser 58 generates one thousand (1000) pulses per gallon of fuel dispensed and transmits the pulser signal to control system 50. In other embodiments, the number of pulses per gallon may range between 250 and 5000 pulses.

Control system 50 controls a drive pulse source 55 that in turn controls motor 53 and thus recovery pump 52. Control system 50 may be a microcontroller, a microprocessor, or other electronic systems with associated memory and software programs running thereon to control the various functions of the fuel dispenser including, but not limited to: fuel transaction authorization, fuel grade selection, display and/or audio control. In some embodiments, pump 42 and motor 44 may be controlled by control system 50 directly and provide operating data thereto.

A vapor flow sensor 54 may be positioned in vapor return line 34, which is configured to sense vapor flow within the vapor return line and hydrocarbon concentration to provide a total volume of hydrocarbons recovered from the gas tank of vehicle 12. In some systems, vapor recovery is dictated by the rate of fuel dispensed, however, in systems equipped with a sensor 54, vapor recovery operates at least semi-independently of fuel dispensing.

Figure 2:
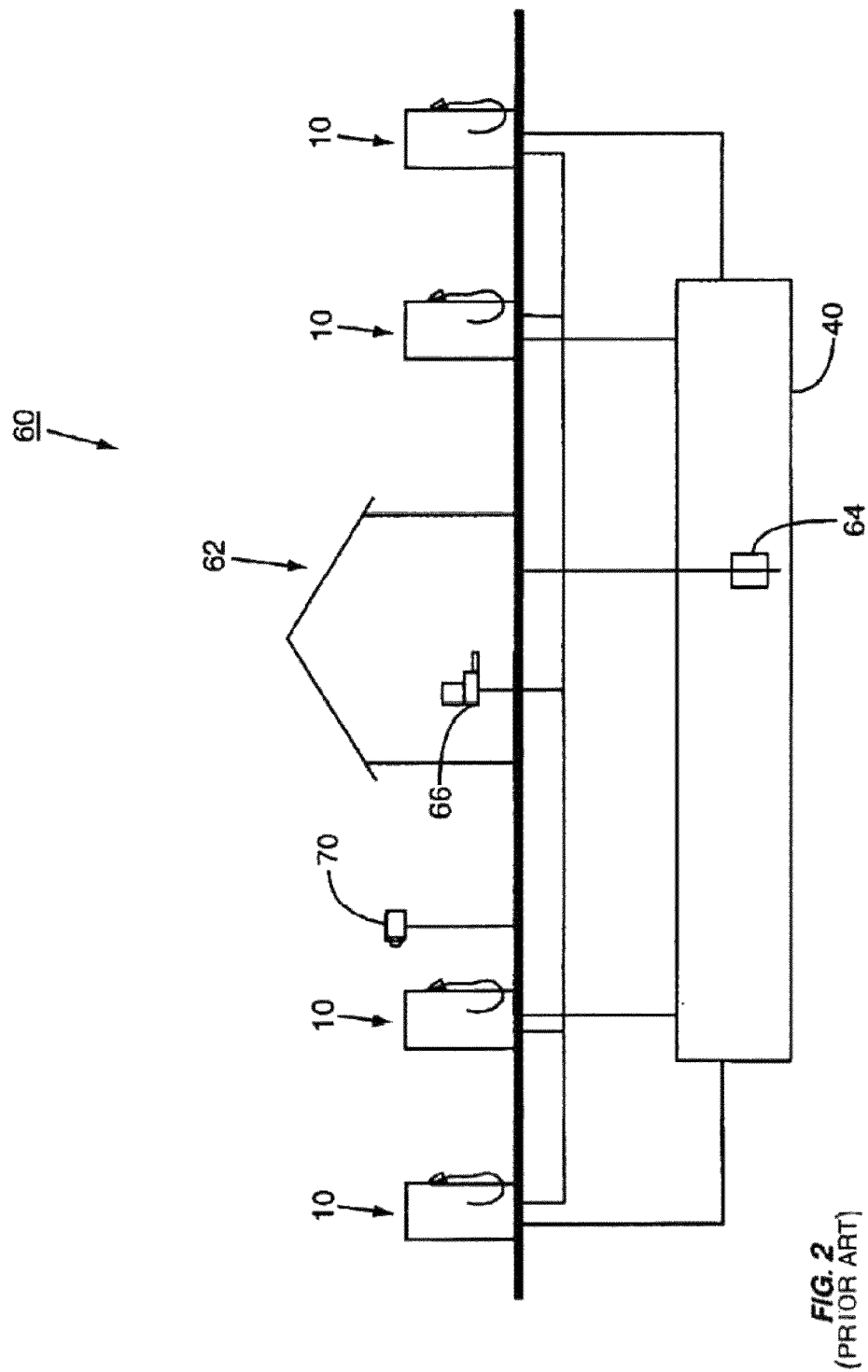
FIG. 2 is a schematic view of a fuel forecourt.

Referring to FIG. 2, a central fuel station building 62 is located within a fueling environment 60. Fueling environment 60 includes fuel station building 62, a plurality of fuel dispensers 10 and a site controller 66 (which typically have an operator terminal associated therewith). Dispensers 10 are fluidly connected to UST 40, in which is positioned a UST sensor 64 that measures the level of fuel within UST 40. Sensor 64 may be a float type sensor, a pressure sensor or any other suitable sensor that is sensitive enough to detect minute changes in the present volume of fuel within UST 40. Most UST sensors 64 are temperature compensated to account for the natural expansion and contraction of the fuel according to the vagaries of the atmospheric temperature. Central station computer 66 is operatively connected to each of dispensers 10 and UST sensor 64. Additionally, central station computer 66 may be connected to each dispenser pump 42 and motor 44. A camera 70 may be positioned to photograph one or more areas around dispensers 10 if fraud is detected to capture images for use in prosecution of thieves.

Figure 3:
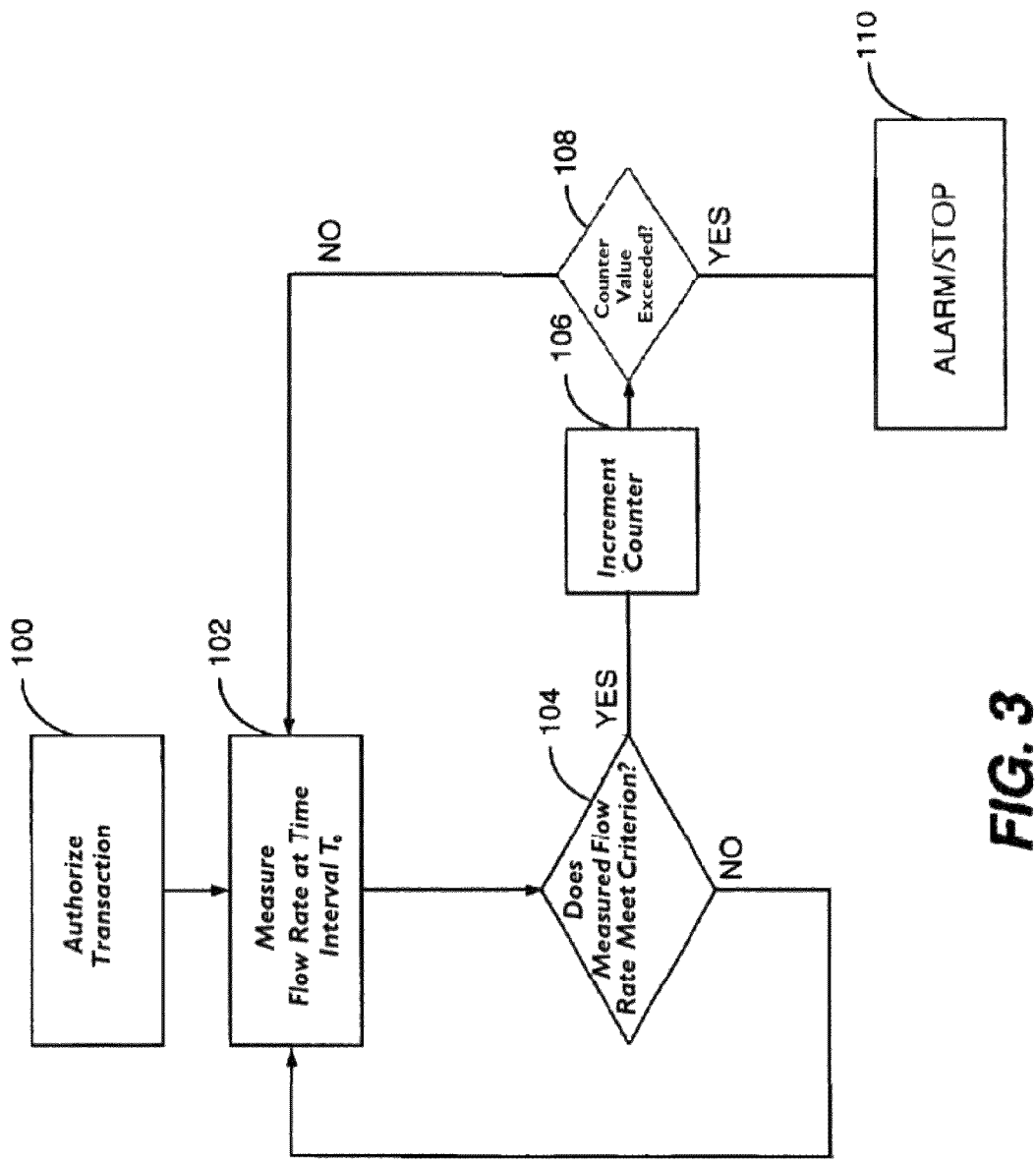
FIG. 3 is a flow diagram showing operation of the fuel dispenser of FIG. 1 in accordance with an embodiment of the present invention.

Referring to FIG. 3, during normal operation, pump 42 would produce pressure in the fuel delivery piping to deliver a normal rate of fuel to the vehicle when the nozzle is fully open, such as ten gallons of fuel per minute. Meter 56 measures this flow rate, causing pulser 58 to produce 10,000 pulses per minute, in this example. Control system 50 receives the pulses and reports correctly that ten gallons are dispensed per minute. If the customer opens the nozzle only partially, the flow rate will be less. There is a minimum flow rate, however, at which the customer would not be expected to dispense fuel for more than a very short period of time.

At step 100, when a transaction is authorized control system 50 allows the customer to begin pumping fuel. At step 102, control system 50 measures the flow rate at a predetermined time interval ($T_o$). At step 104, the flow rate is compared to a predetermined criterion that may be programmed into control system 50. For example, the predetermined criteria may be a low flow range.

If the measured flow is outside the predetermined range, the system returns to step 102 and repeats. If, on the other hand, the measured flow rate is within the predetermined range, at step 106, a counter is incremented. At step 108, the counter value is compared to a preset counter value. If the counter value is less than the preset counter value, the system returns to step 102 and repeats. If, in the alternative, the counter value is equal to or greater than the preset counter value, at step 110, an alarm is produced and flow of fuel is shutoff. Typically, flow of fuel is shutoff by closing the dispenser's internal valve. The system may be configured so that the valve can only be reset after the alarm condition by an authorized operator. The alarm itself may be silent, audible or visual. For example, a silent alarm may be transmitted to the operator of the service station to indicate theft of fuel has been attempted. In other embodiments, instead of incrementing a counter at step 106, control system 50 may be configured to store in memory the sampled flow rate and track the number of times the flow rate falls within the predetermined flow rate range.

In one preferred embodiment, the predetermined time interval ($T_o$) may be 1 second. In other preferred embodiments, the predetermined flow range may be between 0.5 and 2 gpm. In some embodiments, if the internally measured flow rate is within the predetermined flow range for any ten measurements during a single transaction, the alarm and shutoff may be initiated. In other embodiments, the internally measured flow rate must fall within the predetermined flow range for ten consecutive time intervals during a single transaction. In this latter case, the incrementing counter may reset if the currently measure flow is outside of the low flow range. It should be understood that additional alarms, both visual and audible may be included in the system to indicate when theft has been detected. Such alarms may be instead of, or in addition to, shutting down the dispenser and may include telephoning law enforcement, sending an e-mail or text message to a contact person, etc.

In another preferred embodiment, the criterion at step 104 may be whether the pulse rate indicates flow below a predetermined threshold, such as a zero gallons per minute flow rate. If a zero gpm flow rate is measured, at step 106, the counter is incremented. At step 108, the counter value is compared to a preset counter value. If the measured counter value is greater than the preset counter value, at step 110, an alarm is triggered and the dispenser is shut off. In this embodiment, the system detects a pattern of start/stop intervals, which may be indicative of theft. Typically, a thief will turn the pulser a few twists every few seconds so pump 42 does not shut off. Thus, control system 50 is programmed to detect various predetermined patterns in flow rate that may be indicative of theft.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed:

1. A fuel dispenser comprising:
   a fluid flow meter;
   a pulser operatively coupled to said fluid flow meter;
   a control system in electrical communication with said pulser; and
   wherein said control system:
      calculates a flow rate of fuel being dispensed via pulser signals produced by said pulser;
      periodically samples said flow rate as determined from the pulser signals to provide sampled flow rate readings;
      compares said sampled flow rate readings to a predetermined flow criterion, and
      shuts off flow of fuel if at least two of said sampled flow rate readings satisfy a predetermined pattern when compared with said predetermined flow criterion.

2. The fuel dispenser of claim 1, wherein said predetermined flow criterion is a predetermined flow range.

3. The fuel dispenser of claim 1, wherein said predetermined flow rate range is between approximately 0.5 and 2 gallons per minute.

4. The fuel dispenser of claim 1, wherein said control system begins sampling said flow rate at a predetermined time after dispensing has begun.

5. The fuel dispenser of claim 2, wherein said pattern occurs when said sampled flow rate readings fall within said predetermined flow rate range a preset number of times during a single dispensing transaction.

6. The fuel dispenser of claim 5, wherein said preset number is at least ten.

7. The fuel dispenser of claim 5, wherein said control system shuts off flow if said sampled flow rate readings fall within said predetermined flow rate range at least ten consecutive times during a single dispensing transaction.

8. The fuel dispenser of claim 1, wherein said predetermined pattern includes the flow rate approximately equaling zero a preset number of times during a single dispensing transaction.

9. The fuel dispenser of claim 8, wherein the pattern includes the flow rate approximately equaling zero a preset number of consecutive times during a single dispensing transaction.

* * * * *